(12) United States Patent
Watanabe

(10) Patent No.: US 8,233,423 B2
(45) Date of Patent: Jul. 31, 2012

(54) DISPLAY GENERATING DEVICE, DISPLAY GENERATING METHOD, PROGRAM, AND WIRELESS COMMUNICATION SYSTEM

(75) Inventor: Kazuhiro Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 354 days.

(21) Appl. No.: 12/361,491

(22) Filed: Jan. 28, 2009

(65) Prior Publication Data

US 2009/0196207 A1  Aug. 6, 2009

(30) Foreign Application Priority Data

Feb. 5, 2008 (JP) .............................. P2008-025453

(51) Int. Cl.
*H04B 7/14* (2006.01)
(52) U.S. Cl. ........ 370/315; 370/274; 370/279; 370/285; 370/293; 455/428; 455/445; 455/457; 455/11.1
(58) Field of Classification Search .................. None
See application file for complete search history.

(56) References Cited

U.S. PATENT DOCUMENTS

| | | | |
|---|---|---|---|
| 6,477,572 B1 * | 11/2002 | Elderton et al. ............... 709/224 |
| 6,771,966 B1 * | 8/2004 | Chow ........................... 455/446 |
| 7,225,260 B2 * | 5/2007 | Herrod ........................... 709/227 |
| 7,305,623 B2 * | 12/2007 | Despotidis et al. ........... 715/736 |
| 7,706,788 B2 * | 4/2010 | Ascolese et al. ............ 455/432.1 |
| 7,761,098 B1 * | 7/2010 | Nguyen et al. ............ 455/435.2 |
| 2003/0105812 A1 * | 6/2003 | Flowers et al. ............... 709/203 |
| 2005/0060400 A1 * | 3/2005 | Mannepalli et al. .......... 709/223 |
| 2006/0028991 A1 * | 2/2006 | Tan et al. ...................... 370/237 |
| 2007/0041345 A1 * | 2/2007 | Yarvis et al. .................. 370/331 |
| 2007/0161371 A1 * | 7/2007 | Dobrowski et al. ........... 455/423 |
| 2007/0214412 A1 * | 9/2007 | Arquie et al. ................. 715/526 |
| 2009/0252065 A1 * | 10/2009 | Zhang et al. .................. 370/256 |
| 2011/0026425 A1 * | 2/2011 | Picard ........................... 370/252 |

FOREIGN PATENT DOCUMENTS

| | | |
|---|---|---|
| JP | 2003-283544 | 10/2003 |
| JP | 2004-282695 | 10/2004 |
| JP | 2005-524368 | 8/2005 |
| JP | 2005-303998 | 10/2005 |
| JP | 2006-254051 | 9/2006 |
| JP | 2007-215179 | 8/2007 |
| JP | 2008-283275 | 11/2008 |
| WO | WO-03/098447 | 11/2003 |
| WO | WO-03/098447 A1 | 11/2003 |
| WO | WO 2008053465 A1 * | 5/2008 |

OTHER PUBLICATIONS

Office Action for Chinese Application No. 20090000500.4, issued Dec. 27, 2010, 10 pages.

* cited by examiner

*Primary Examiner* — Dai A Phuong
(74) *Attorney, Agent, or Firm* — Finnegan, Henderson, Farabow, Garrett & Dunner, L.L.P.

(57) ABSTRACT

A display generating device includes a display screen generator generating a display screen showing connection status between each wireless communication device in a wireless network in which a plurality of the wireless communication devices operate in an autonomous and distributed manner, and a detector detecting an operation of changing connection status performed by a user via the display screen generated by the display screen generator, wherein, when the operation of changing connection status is detected by the detector, the display generating device performs a change process of reflecting the content of the operation of changing connection status.

15 Claims, 13 Drawing Sheets

| DESTINATION DEVICE | NEXT HOP DEVICE | HOP COUNT |
|---|---|---|
| B | B | 1 |
| C | C | 1 |
| D | B | 2 |

FIG.3

| DESTINATION DEVICE | NEXT HOP DEVICE | HOP COUNT |
|---|---|---|
| B | B | 1 |
| C | C | 1 |
| D | C | 2 |

FIG.4

| DESTINATION DEVICE | NEXT HOP DEVICE | HOP COUNT |
|---|---|---|
| B | C | 2 |
| C | C | 1 |
| D | C | 2 |

FIG.8

| DESTINATION DEVICE | NEXT HOP DEVICE | HOP COUNT |
|---|---|---|
| B | B | 1 |
| C | C | 1 |
| D | B | 2 |
| E | C | 2 |
| F | B | 3 |

FIG.11

| DESTINATION DEVICE | NEXT HOP DEVICE | HOP COUNT |
|---|---|---|
| B | C | 2 |
| C | C | 1 |
| D | C | 3 |
| E | C | 2 |
| F | C | 3 |

FIG.13

| DESTINATION DEVICE | NEXT HOP DEVICE | HOP COUNT |
|---|---|---|
| B | B | 1 |
| C | C | 1 |
| D | B | 2 |
| E | B | 3 |
| F | B | 3 |

DISPLAY GENERATING DEVICE, DISPLAY GENERATING METHOD, PROGRAM, AND WIRELESS COMMUNICATION SYSTEM

CROSS REFERENCES TO RELATED APPLICATIONS

The present invention contains subject matter related to Japanese Patent Application JP 2008-025453 filed in the Japan Patent Office on Feb. 5, 2008, the entire contents of which being incorporated herein by reference.

BACKGROUND OF THE INVENTION

1. Field of the Invention

The present invention relates to a display generating device, a display generating method, a program and a wireless communication system.

2. Description of the Related Art

In recent years, a wireless multi-hop network is drawing attention in which a plurality of wireless communication devices operate in an autonomous and distributed manner and the communication area can be easily enlarged. In such a wireless multi-hop network, a communication path between a transmitting device and a receiving device is determined by a routing protocol, and data is transmitted from the transmitting device along the determined communication path.

Further, when there are multiple communication paths to the receiving device, to select a communication path, statistical information indicating wireless link status between the transmitting device and a relay device, for example, is taken into consideration. The statistical information indicating wireless link status may be various information depending on the assumed system. For example, when constructing a stream transmission system or a high traffic system, the statistical information may be throughput value, delay time, or the like. On the other hand, when constructing a system where packet transmission/reception may be performed with high reliability, even if the throughput may be somewhat low, the statistical information may be a received signal strength indicator (RSSI), a packet error rate (PER), or the like.

Then, when an event occurs that causes a change in the wireless link, for example, when a wireless communication device moves in the wireless multi-hop network or the power is cut off, the communication path is reset by the routing protocol according to the change. For example, JP-A-2007-215179 discloses a method for notifying a wireless multi-hop network of the occurrence of such events that cause a change in the wireless link.

SUMMARY OF THE INVENTION

However, there are cases where a user is aware beforehand of the occurrence of an event that causes a change in the wireless link, or the user desires to control the communication path according to his needs or object. Thus, a structure has been desired where the routing protocol operates in an autonomous and distributed manner, and, at the same time, a user can engage in the setting of a communication path.

Thus, in view of the foregoing, it is desirable to provide a new and improved display generating device, a display generating method, a program and a wireless communication system capable of changing connection status between wireless communication devices based on a user operation and resetting a communication path.

According to an embodiment of the present invention, there is provided a display generating device including a display screen generator generating a display screen showing connection status between each wireless communication device in a wireless network in which a plurality of the wireless communication devices operate in an autonomous and distributed manner, and a detector detecting an operation of changing connection status performed by a user via the display screen generated by the display screen generator, wherein, when the operation of changing connection status is detected by the detector, the display generating device performs a change process of reflecting the content of the operation of changing connection status.

With such a configuration, the user can perform the operation of changing connection status between the wireless communication devices via the display screen generated by the display screen generator. Then, when the change operation is performed by the user, the display generating device performs the change process of reflecting the content of the change operation. That is, according to the display generating device, a process according to the operation of changing connection status by the user can be performed.

The display generating device may have a function of the wireless communication device configuring the wireless network, and may further include a path setter setting a path to another wireless communication device in the wireless network, wherein, when the operation of changing connection status is detected by the detector, the path setter may reset, as the change process, the path to the other wireless communication device according to the content of the operation of changing connection status. With such a configuration, when the change operation is performed by the user, a communication path to another wireless communication device is reset according to the change operation. That is, according to the display generating device, it is made possible for a routing protocol to operate in an autonomous and distributed manner, and, at the same time, for the user to engage in the setting of a communication path.

When the operation of changing connection status is detected by the detector, the display screen generator may generate, as the change process, a display screen reflecting the content of the operation of changing connection status. With such a configuration, it is made possible for the user viewing the display screen to visually grasp the connection status between each wireless communication device.

The display generating device may further include a transmitter transmitting, when the operation of changing connection status is detected by the detector, the content of the operation of changing connection status to the wireless communication device in the wireless network. With such a configuration, it is made possible for the wireless communication device that received the content of the operation of changing connection status transmitted from the transmitter to perform a process according to the content of the change operation, such as resetting of the communication path.

According to another embodiment of the present invention, there is provided a display generating method, including the steps of generating a display screen showing connection status between each wireless communication device in a wireless network in which a plurality of the wireless communication devices operate in an autonomous and distributed manner, detecting an operation of changing connection status performed by a user via the display screen, and performing, when the operation of changing connection status is detected, a change process of reflecting the content of the operation of changing connection status.

According to another embodiment of the present invention, there is provided a program causing a computer to function as a display screen generator generating a display screen showing connection status between each wireless communication device in a wireless network in which a plurality of the wireless communication devices operate in an autonomous and distributed manner, and a detector detecting an operation of changing connection status performed by a user via the display screen generated by the display screen generator, wherein the program causes the computer to perform, when the operation of changing connection status is detected by the detector, a change process of reflecting the content of the operation of changing connection status.

The program can have the functions of the display screen generator and the detector described above performed by computer hardware resources that include, for example, a CPU, a ROM, a RAM, and the like. That is, it is possible to cause a computer using such program to function as the display screen generator and the detector described above.

According to another embodiment of the present invention, there is provided a wireless communication system including a plurality of wireless communication devices that operate in an autonomous and distributed manner and configure a wireless network, wherein each of the plurality of the wireless communication devices includes a path setter setting a path to another wireless communication device in the wireless network, a display screen generator generating a display screen showing connection status between each wireless communication device in the wireless network, and a detector detecting an operation of changing connection status performed by a user via the display screen generated by the display screen generator, wherein, when the operation of changing connection status is detected by the detector, the path setter resets the path to the other wireless communication device according to the content of the operation of changing connection status.

According to the embodiments of the present invention, connection status between wireless communication devices can be changed based on a user operation, and a communication path can be reset.

BRIEF DESCRIPTION OF THE DRAWINGS

FIG. 2 is an explanatory diagram showing a path table where all the wireless links are Permit.

FIG. 3 is an explanatory diagram showing a path table where some of the wireless links are Willnever.

FIG. 4 is an explanatory diagram showing a path table where some of the wireless links are Refuse.

FIG. 8 is an explanatory diagram showing an example of a path table generated by a path table generator.

FIG. 11 is an explanatory diagram showing the updated path table.

FIG. 13 is an explanatory diagram showing the updated path table.

DETAILED DESCRIPTION OF THE PREFERRED EMBODIMENTS

Figure 1:
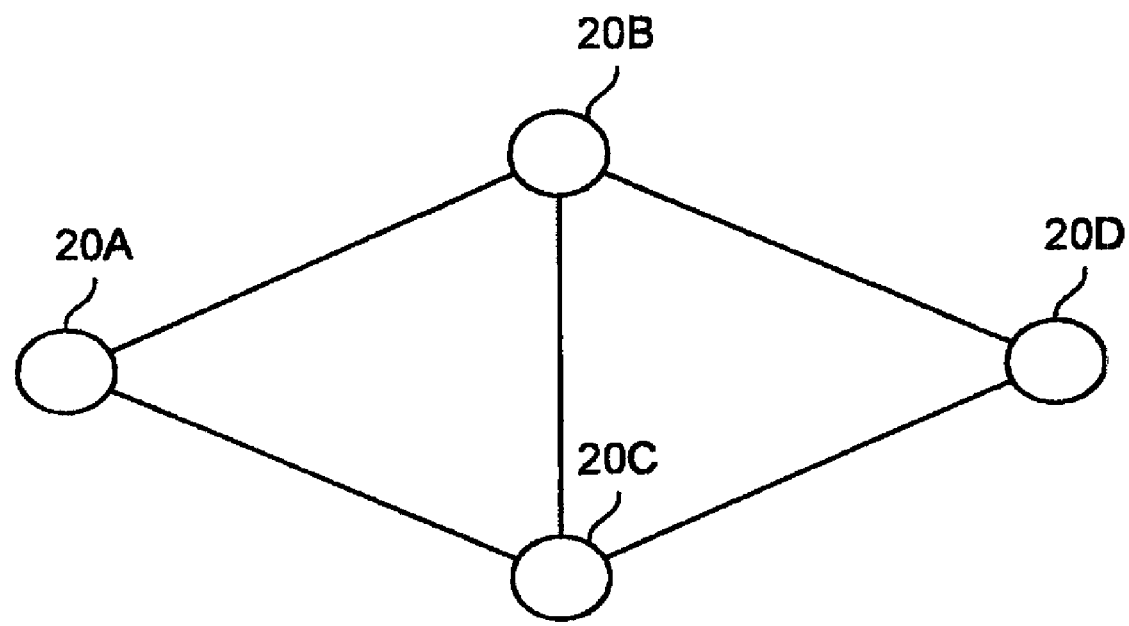
FIG. 1 is an explanatory diagram showing a structure of a wireless communication system according to a present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The preferred embodiment of the present invention will be described in the order shown below.

(1) Overview of a wireless communication system according to the present embodiment
(2) Configuration of a wireless communication device
(3) Operation of the wireless communication device
(4) Conclusion (1) Overview of a Wireless Communication System According to the Present Embodiment First, referring to FIGS. 1 to 4, a wireless communication system 1 according to the present embodiment will be schematically described.

FIG. 1 is an explanatory diagram showing a structure of the wireless communication system 1 according to the present embodiment. As shown in FIG. 1, the wireless communication system 1 includes a plurality of wireless communication devices 20A to 20D. Incidentally, in this specification, to distinguish the wireless communication devices from each other, capital letters are added to the reference numeral, such as wireless communication devices 20A to 20D. However, when it is not necessary to particularly distinguish the wireless communication devices from each other, they are collectively referred to as the wireless communication device 20.

Also, in FIG. 1, the wireless communication device 20 is shown simply as a circle as an example of the display generating device. However, the wireless communication device 20 may be an arbitrary information processor, such as a personal computer (PC), an image processing apparatus in homes (a DVD recorder, a video cassette recorder or the like), a mobile phone, a Personal Handyphone System (PHS), a portable music playback device, a portable image processing device, a personal digital assistants (PDA), a home game machine, a portable game machine, home electronics, or the like.

The wireless communication device 20 can perform unicast for transmitting data to a particular wireless communication device, or flooding communication. Here, the flooding communication is a communication where each wireless communication device 20 that received data including, for example, path information broadcasts the data so that the data is relayed to one wireless communication device after another. Relaying of data by a wireless communication device 20 may be also expressed as hop.

When unicasting, the wireless communication device 20 transmits data along a communication path determined by the routing protocol. Here, the communication path determined by the routing protocol differs depending on the wireless link (connection status) between each wireless communication device 20. In this specification, such a wireless link will be expressed using one of the following three stages.

(1) Permit

In the routing protocol, the wireless link can be used as a non-relay link, and also as a relay link.

(2) Willnever

In the routing protocol, the wireless link can be used as a non-relay link, but not as a relay link.

(3) Refuse

In the routing protocol, the wireless link can be used neither as a non-relay link nor as a relay link.

Here, the relay link is a link between a transmitting device and a receiving device, and it means that the data transmitted from the transmitting device is relayed by the receiving device. For example, in the example shown in FIG. 1, when the wireless communication device 20A transmits data to the wireless communication device 20D as the destination via the wireless communication device 20B, the link between the wireless communication devices 20A and 20B corresponds to the relay link.

Further, the non-relay link is a link between a transmitting device and a receiving device, and it means that the final destination of the data transmitted from the transmitting device is the receiving device and that the receiving device does not relay the data. For example, in the example shown in FIG. 1, when the wireless communication device 20A transmits data to the wireless communication device 20B as the destination, the link between the wireless communication devices 20A and 20B corresponds to the non-relay link.

Due to the property of the wireless link as described above, when the wireless link changes, the communication path is also changed by the routing protocol. A case where the communication path is changed following the change in the wireless link will be described with reference to FIGS. 2 to 4. Incidentally, in the present embodiment, any routing protocol, such as a pro-active routing protocol, a reactive routing protocol, a hybrid routing protocol, or the like, may be used.

FIG. 2 is an explanatory diagram showing the path table of the wireless communication device 20A where all the wireless links are Permit. Since all the wireless links are Permit, the link between the wireless communication devices 20A and 20B can also be used as a relay link. Thus, as shown in FIG. 2, when the destination is the wireless communication device 20D, a communication path with 2 hops, going through the wireless communication device 20B, is set. Incidentally, in this specification, to simplify the description, it is assumed that the letter added to the reference numeral of a device corresponds to the address of the device. For example, the description is made assuming that the address of the wireless communication device 20B is B.

FIG. 3 is an explanatory diagram showing the path table of the wireless communication device 20A where the wireless link between the wireless communication devices 20A and 20B is Willnever. Since the wireless link between the wireless communication devices 20A and 20B is Willnever, the link between the wireless communication devices 20A and 20B cannot be used as a relay link. Thus, as shown in FIG. 3, when the destination is the wireless communication device 20D, a communication path with 2 hops, going through the wireless communication device 20C not 20B, is set.

FIG. 4 is an explanatory diagram showing the path table of the wireless communication device 20A where the wireless link between the wireless communication devices 20A and 20B is Refuse. Since the wireless link between the wireless communication devices 20A and 20B is Refuse, the link between the wireless communication devices 20A and 20B can be used neither as a relay link nor as a non-relay link. Thus, as shown in FIG. 4, when the destination is the wireless communication device 20D, a communication path with 2 hops, going through the wireless communication device 20C not 20B, is set. Further, when the destination is the wireless communication 20B, a communication path with 2 hops, going through the wireless communication device 20C, is set.

Heretofore, the wireless communication system 1 according to the present embodiment has been schematically described with reference to FIGS. 1 to 4. Each wireless communication device 20 structuring the wireless communication system 1 enables the routing protocol to operate in an autonomous and distributed manner, and, at the same time, enables a user to engage in the setting of a communication path. Hereunder, such a wireless communication device 20 will be described in detail with reference to FIGS. 5 to 15.

(2) Configuration of a Wireless Communication Device

Figure 5:
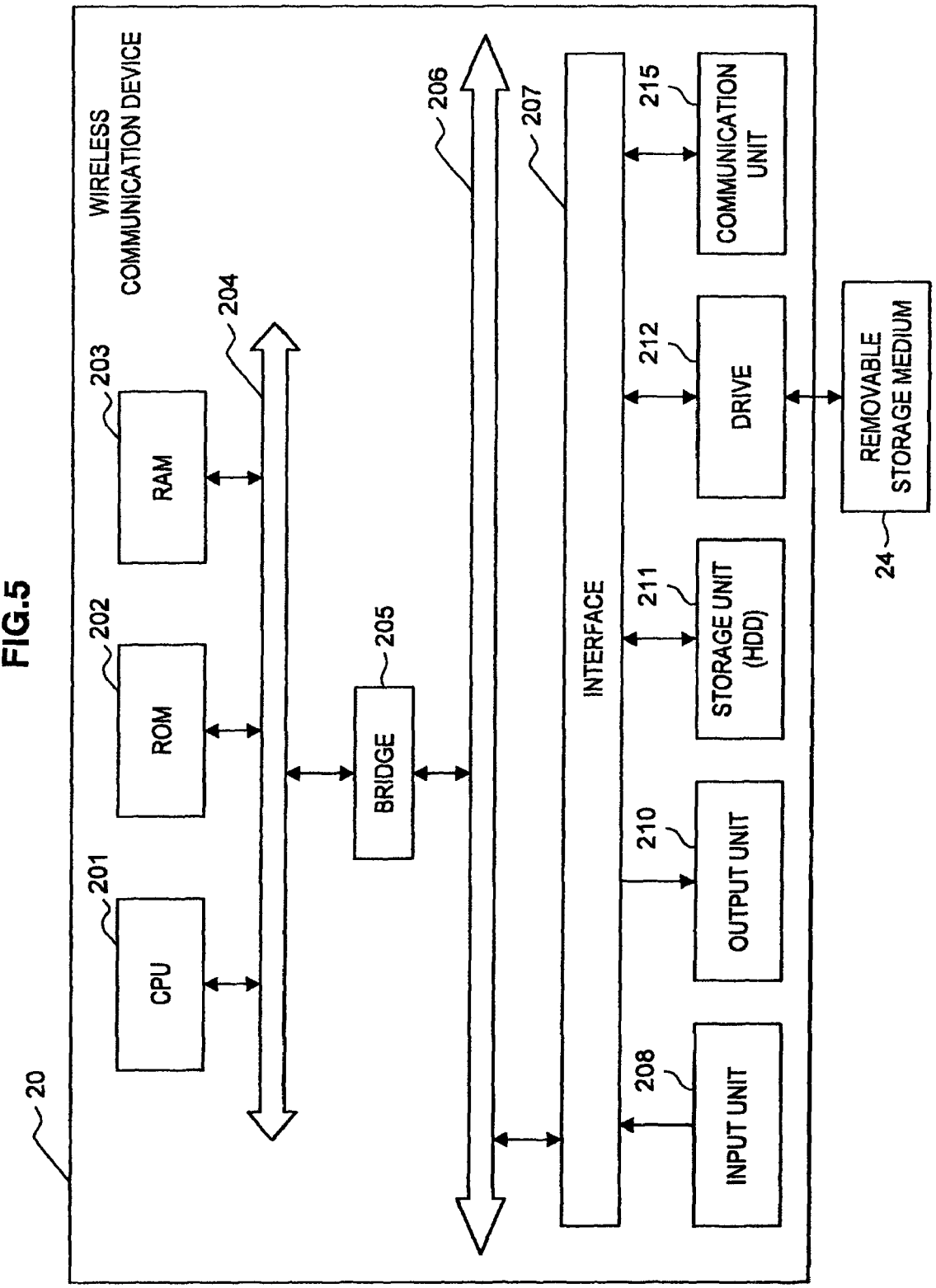
FIG. 5 is an explanatory diagram showing a hardware configuration of a wireless communication device according to the present embodiment.

FIG. 5 is an explanatory diagram showing a hardware configuration of the wireless communication device 20 according to the present embodiment. As shown in FIG. 5, the wireless communication device 20 includes a central processing unit (CPU) 201, a read only memory (ROM) 202, a random access memory (RAM) 203, a host bus 204, a bridge 205, an external bus 206, an interface 207, an input unit 208, an output unit 210, a storage unit (HDD) 211, a drive 212, and a communication unit 215.

The CPU 201 functions as a computational processing device and a control device and performs overall control of operations within the wireless communication device 20 according to various programs. The CPU 201 may also be a microprocessor. The ROM 202 stores programs, computational parameters, and the like to be used by the CPU 201. The RAM 203 temporarily stores the programs to be used by the CPU 201 in its execution, as well as parameters and the like that are changed as necessary in the execution of the programs. The CPU 201, the ROM 202, and the RAM 203 are interconnected by the host bus 204, which is configured from a CPU bus and the like.

The host bus 204 is connected through the bridge 205 to the external bus 206, such as a peripheral component interconnect/interface (PCI) bus or the like. Note that it is not necessary for the host bus 204, the bridge 205, and the external bus 206 to be configured separately. All of their functions may also be incorporated into a single bus.

The input unit 208 is configured from, for example, an input section for a user to input information, such as a mouse, a keyboard, a touch panel, a button, a microphone, a switch, a lever, or the like, and an input control circuit for generating an input signal based on the input by the user and outputting the same to the CPU 201. By operating the input unit 208, the user of the wireless communication device 20 can input various data to the wireless communication device 20 or instruct the wireless communication device 20 to perform processing operations.

The output unit 210 is configured from, for example, a display unit, such as a cathode ray tube (CRT) display unit, a liquid crystal display (LCD) unit, an organic light emitting display (OLED) unit, a lamp, or the like, and an audio output unit such as a speaker, a headphone, or the like. The output unit 210 outputs the content that is played back, for example.

Specifically, the display unit displays, in the form of text or images, various types of information that are played back, such as video data and the like. On the other hand, the audio output unit converts the audio data and the like that are played back to sound and outputs the sound.

The storage unit 211 is a unit for data storage that is configured as an example of a storage of the wireless communication device 20 according to the present embodiment. The storage unit 211 may include a storage medium, a recording unit that records data in the storage medium, a readout unit that reads out data from the storage medium, a deleting unit that deletes the data that is recorded in the storage medium, and the like. The storage unit 211 is configured from a hard disk drive (HDD), for example. The storage unit 211 drives the hard disk and stores various types of data and the programs that the CPU 201 executes. Further, the path table and the like are stored in the storage unit 211.

The drive 212 is a reader/writer for a storage medium and is built into or attached externally to the wireless communication device 20. The drive 212 reads out and outputs to the RAM 203 information that is stored in a removable storage medium 24, such as a magnetic disk, an optical disk, a magneto-optical disk, a semiconductor memory, or the like that is mounted.

The communication unit 215 is a communication interface that is configured from, for example, a communication device or the like for communicating with another wireless communication device 20. Further, the communication unit 215 may be a wireless local area network (LAN) compatible communication unit, a wireless USB compatible communication unit or a wired communication unit that performs communication using a fixed line. The communication unit 215 transmits/receives various data to/from another wireless communication device 20.

Heretofore, the hardware configuration of the wireless communication device 20 according to the present embodiment has been described with reference to FIG. 5. Next, with reference to FIG. 6, the functions of the wireless communication device 20 according to the present embodiment will be described.

Figure 6:
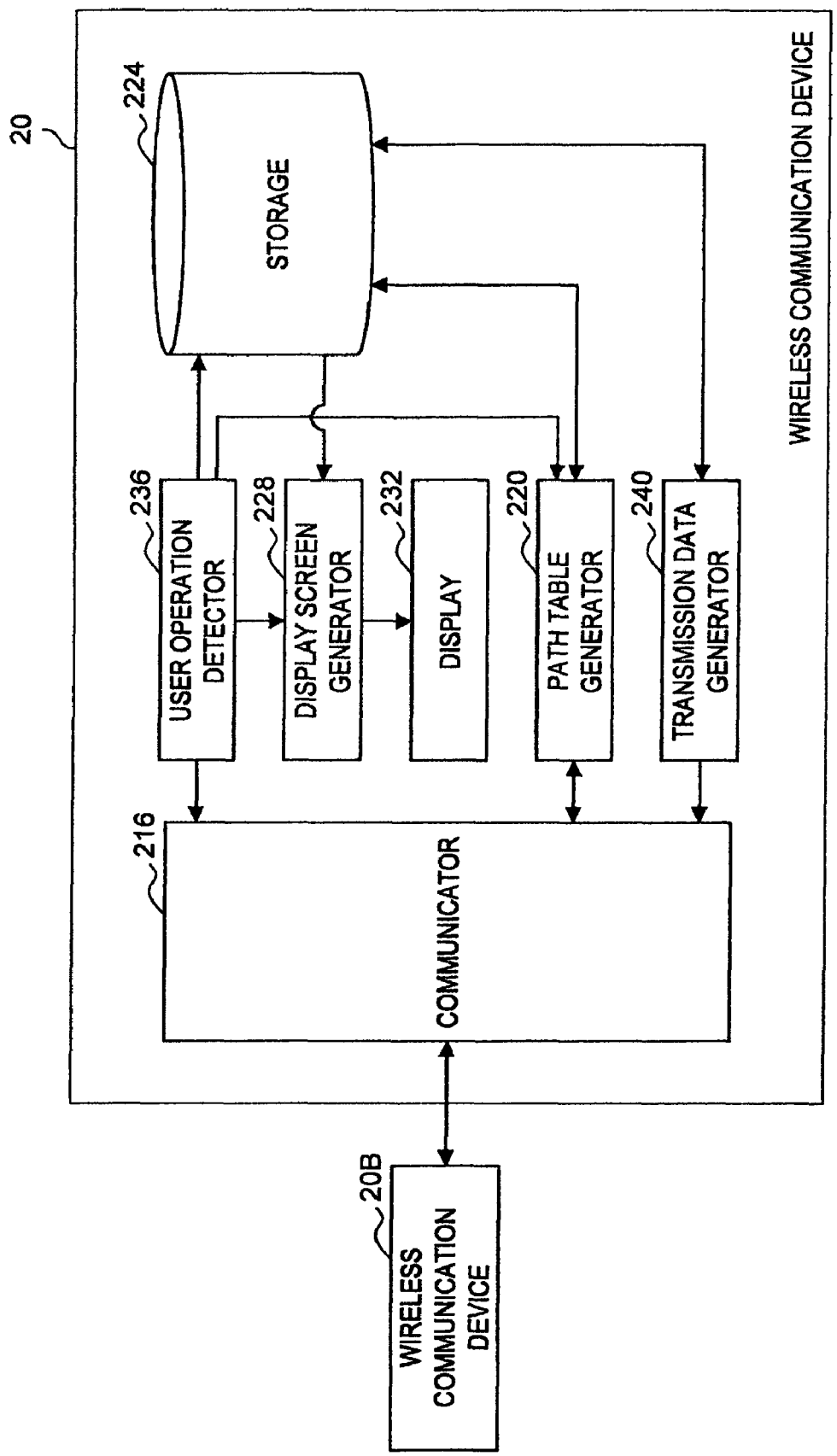
FIG. 6 is a function block diagram showing a configuration of the wireless communication device according to the present embodiment.

FIG. 6 is a function block diagram showing a configuration of the wireless communication device 20 according to the present embodiment. As shown in FIG. 6, the wireless communication device 20 includes a communicator 216, a path table generator 220, a storage 224, a display screen generator 228, a display 232, a user operation detector 236, and a transmission data generator 240.

The communicator 216 is an interface to another wireless communication device 20, and has functions of a transmitter and a receiver transmitting/receiving various information to/from the other wireless communication device 20. For example, the communicator 216 down-converts a high-frequency wireless signal transmitted from the other wireless communication device 20 to a baseband signal, and converts the baseband signal to a bit string. Also, the communicator 216 unicasts or broadcasts wirelessly various data generated by the transmission data generator 240.

Incidentally, the communicator 216 may have the wireless communication function specified by IEEE (Institute of Electrical and Electronic Engineers) 802.11a, b, g and the like, or the MIMO (Multiple Input Multiple Output) communication function as specified by IEEE 802.11n. Further, the communicator 216 may have the communication function compliant with WiMAX (Worldwide Interoperability for Microwave Access) standardized by IEEE 802.16.

The path table generator 220 has a function of a path setter that determines, according to an arbitrary routing protocol, the communication path to another wireless communication device 20, and stores the determined communication path as a path table in the storage 224. For example, as shown in FIGS. 2 to 4, in the path table, the destination wireless communication device 20, the next hop device, and the hop counts to the destination wireless communication device 20 may be correlated with each other.

The storage 224 is a storage medium in which the path table generated by the path table generator 220 and the like are stored. Such storage 224 may be a non-volatile memory such as an electrically erasable programmable read-only memory (EEPROM), an erasable programmable read-only memory (EPROM) or the like, a magnetic disk such as a hard disk, a circular magnetic disk or the like, an optical disk such as a compact disc recordable (CD-R), a compact disc rewritable (CD-RW), a digital versatile disc recordable (DVD-R), a digital versatile disc rewritable (DVD-RW), a dual-layer digital versatile disc recordable (DVD+R), a dual-layer digital versatile disc rewritable (DVD+RW), a digital versatile disc random access memory (DVD-RAM), a Blu-ray™ disc recordable (BD-R), a dual-layer Blu-ray™ disc recordable (BD-RE) or the like, or a magneto-optical (MO) disk, or the like.

The display screen generator 228 generates a display screen showing connection status between each wireless communication device 20. The connection status between each wireless communication device 20 may be obtained from peripheral wireless communication devices 20. The display 232 displays the display screen generated by the display screen generator 228. For example, the display 232 displays a display screen 30 showing connection status shown in FIG. 7 generated by the display screen generator 228.

Figure 7:
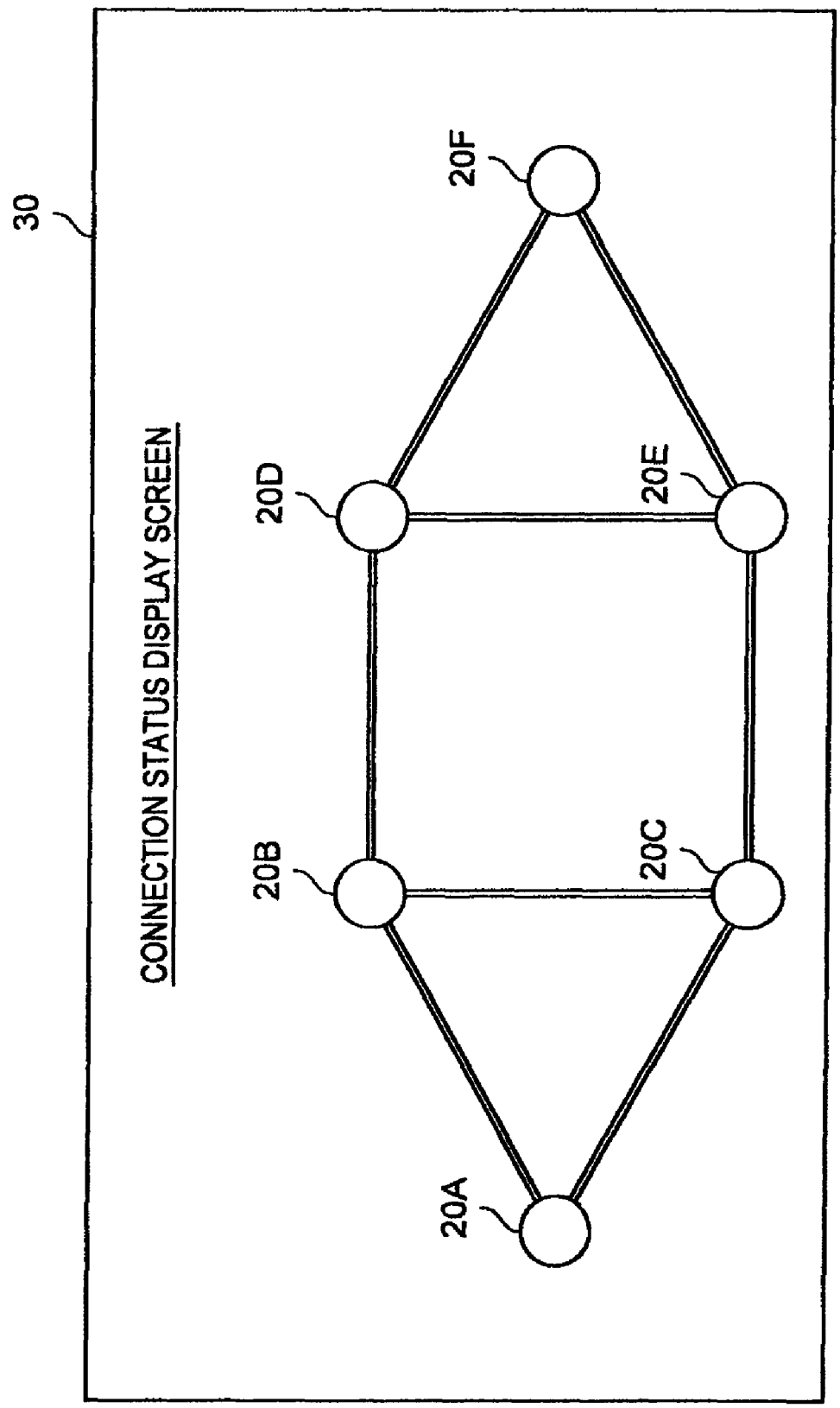
FIG. 7 is an explanatory diagram showing an example of a display screen showing connection status.

FIG. 7 is an explanatory diagram showing an example of the display screen 30 showing connection status. As shown in FIG. 7, the display screen 30 showing connection status includes a display of a plurality of the wireless communication devices 20A to 20F and a display of wireless links between the plurality of the wireless communication devices 20A to 20F. In FIG. 7, it is indicated that a wireless link shown by a double line is Permit. That is, in FIG. 7, all the wireless links are Permit. In this case, a path table shown in FIG. 8 is generated by the path table generator 220 of the wireless communication device 20A.

FIG. 8 is an explanatory diagram showing an example of the path table generated by the path table generator 220. As shown in FIG. 8, when all the wireless links are Permit, the hop count of the communication path to the wireless communication device 20B is 1 since the wireless communication device 20B corresponds to the next hop device. Also, the communication path to the wireless communication device 20D goes through the wireless communication device 20B, and its hop count is 2.

Note that the display screen 30 showing connection status shown in FIG. 7 shows the connection statuses of the plurality of the wireless communication devices 20A to 20F, and does not represent the actual location relationship. However, the display screen generator 228 may generate a display screen 30 showing connection status representing the actual location relationship between the plurality of the wireless communication devices 20A to 20F. Such a function is realized by each of the plurality of the wireless communication devices 20A to 20F obtaining the location information of itself by an arbitrary means and transmitting the same. Based on the location information transmitted from the plurality of the wireless communication devices 20A to 20F, the display screen generator 228 can determine the display position of each of the wireless communication devices 20A to 20F on the display screen 30 showing connection status.

Further, the arbitrary means for obtaining the location information may be a global positioning system (GPS) measuring the current location based on navigation data transmitted from four or more satellites or a means for estimating the current location based on the intensity of WiFi signals transmitted from a peripheral WiFi base station and the base station location.

Here, returning to FIG. 6 to describe the configuration of the wireless communication device 20, the user operation detector 236 has a function of a detector detecting an operation of changing a wireless link by a user. When the operation of changing a wireless link is detected by the user operation detector 236, the display screen generator 228 changes the display screen 30 showing connection status to be generated. Further, the path table generator 220 updates the contents of the path table.

Further, when the operation of changing a wireless link is detected by the user operation detector 236, the communicator 216 may transmit the content of the change operation to a peripheral wireless communication device. With such a configuration, the peripheral wireless communication device can update the path table based on the received content of the change operation. Hereunder, with reference to FIGS. 9 to 13, a concrete example is shown where the display screen 30 showing connection status and the path table are changed based on the operation of changing a wireless link by a user.

Figure 9:
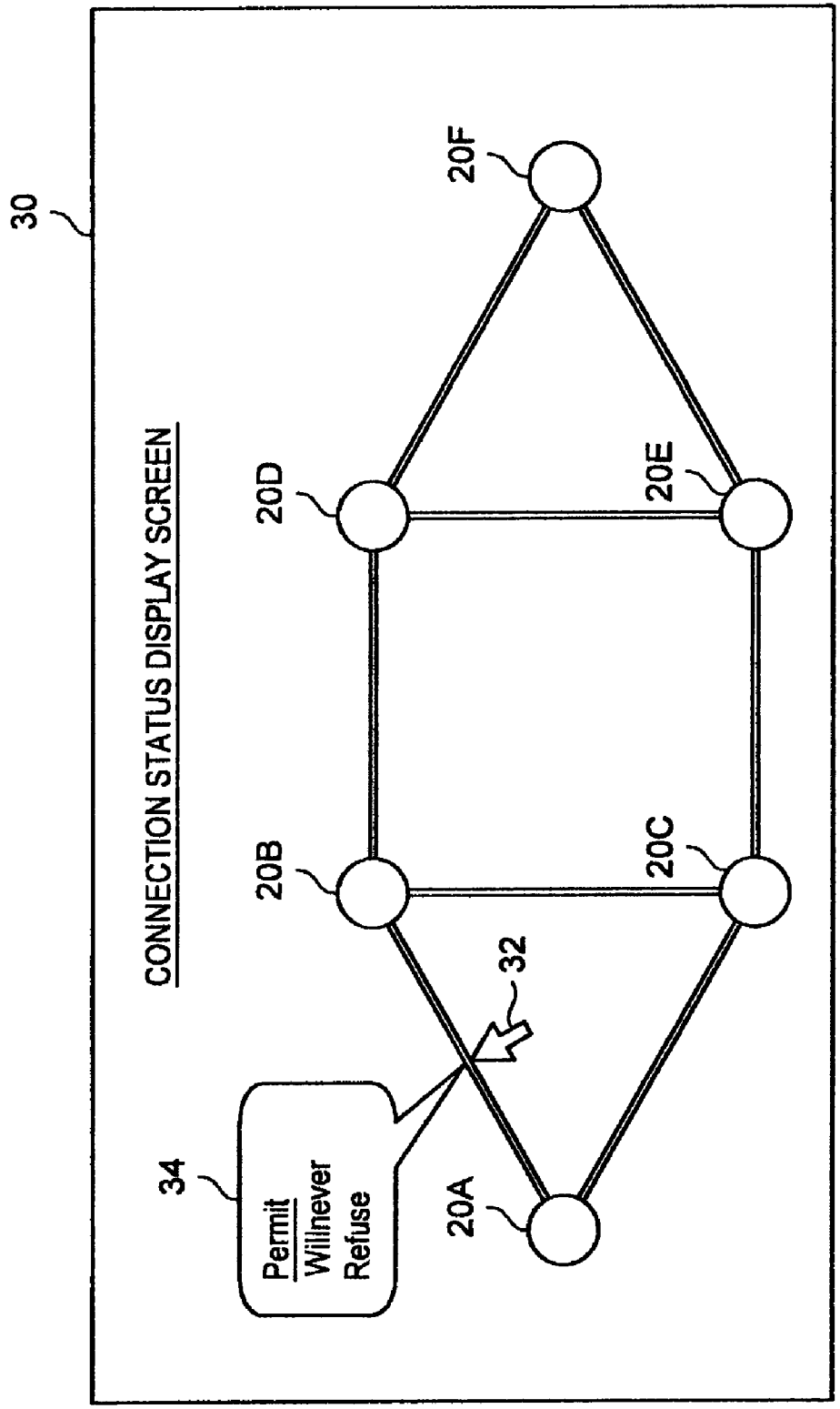
FIG. 9 is an explanatory diagram showing a case where a user operation is being performed on the display screen showing connection status.
Figure 10:
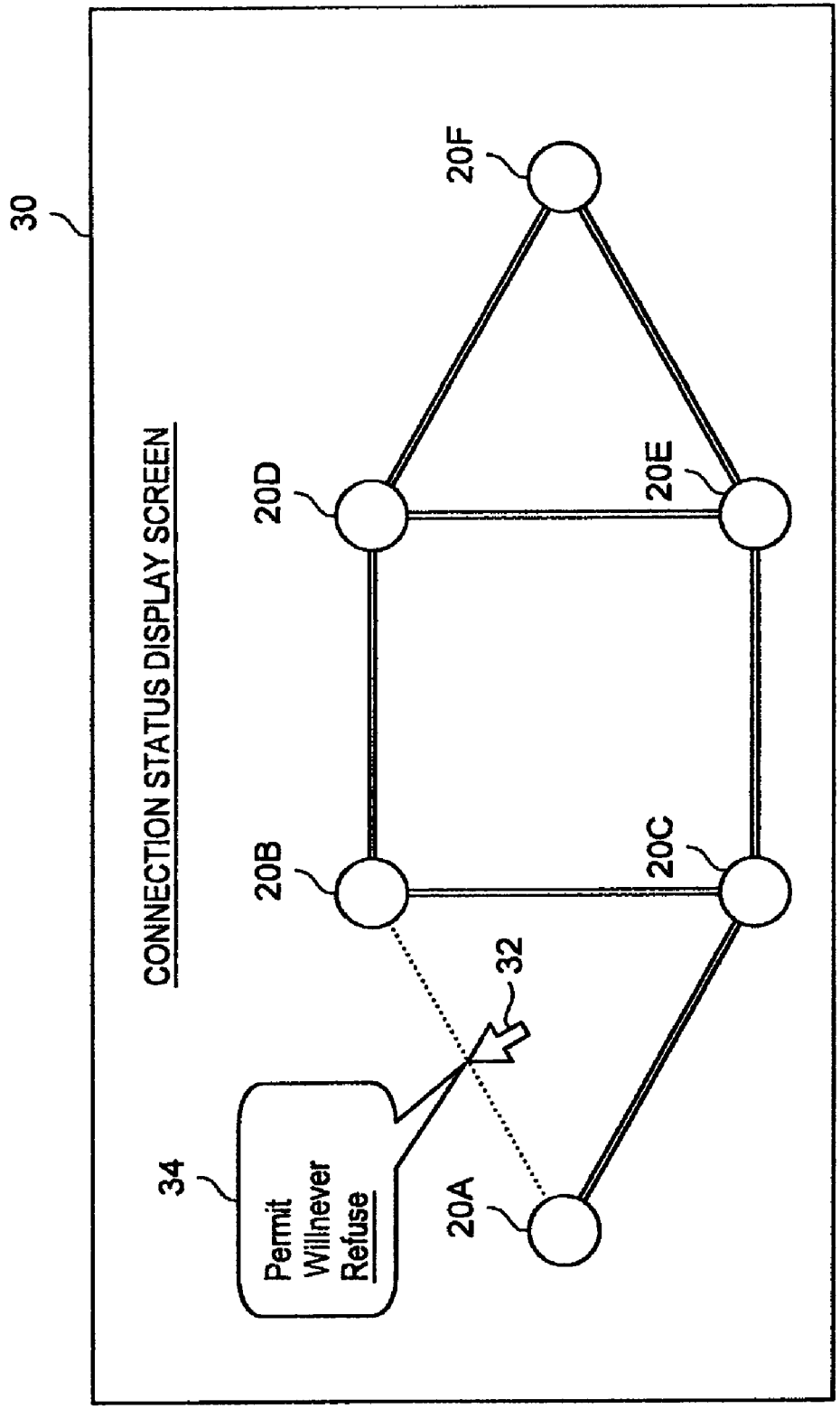
FIG. 10 is an explanatory diagram showing a case where a user operation is being performed on the display screen showing connection status.

FIGS. 9 and 10 are explanatory diagrams showing a case where a user operation is being performed on the display screen 30 showing connection status. On the display screen 30 showing connection status, a user may change the status of a wireless link by pointing to a desired wireless link with a cursor 32. In the example shown in FIG. 9, when the user points to the wireless link between the wireless communication devices 20A and 20B with the cursor 32, a status selection window 34 is displayed. The status selection window 34 includes Permit, Willnever and Refuse. In the phase shown in FIG. 9, since the wireless link between the wireless communication devices 20A and 20B is Permit, Permit is being underlined.

When Refuse is selected by the user in the status selection window 34 shown in FIG. 9, the display screen generator 228 generates the display screen 30 showing connection status shown in FIG. 10. That is, as shown in FIG. 10, when Refuse is selected by the user in the status selection window 34 shown in FIG. 9, the wireless link between the wireless communication devices 20A and 20B is changed to a dotted line indicating Refuse. Further, in the status selection window 34, Refuse is underlined.

Further, when Refuse is selected by the user in the status selection window 34 shown in FIG. 9, the path table generator 220 updates the path table shown in FIG. 8 to the path table shown in FIG. 11.

FIG. 11 is an explanatory diagram showing the updated path table. As shown in FIG. 11, when the wireless link between the wireless communication devices 20A and 20B are changed to Refuse by the user, the communication path to the wireless communication device 20B is changed to a path with 2 hops, going through the wireless communication device 20C. Also, the communication path to the wireless communication device 20D is changed to a path with 3 hops, going through the wireless communication devices 20C and 20E.

Heretofore, a case has been described where the wireless link between the wireless communication devices 20A and 20B is changed to Refuse by the user. Next, referring to FIGS. 12 and 13, a concrete example of the path table and the display screen 30 showing connection status where another change operation is performed by the user will be described.

Figure 12:
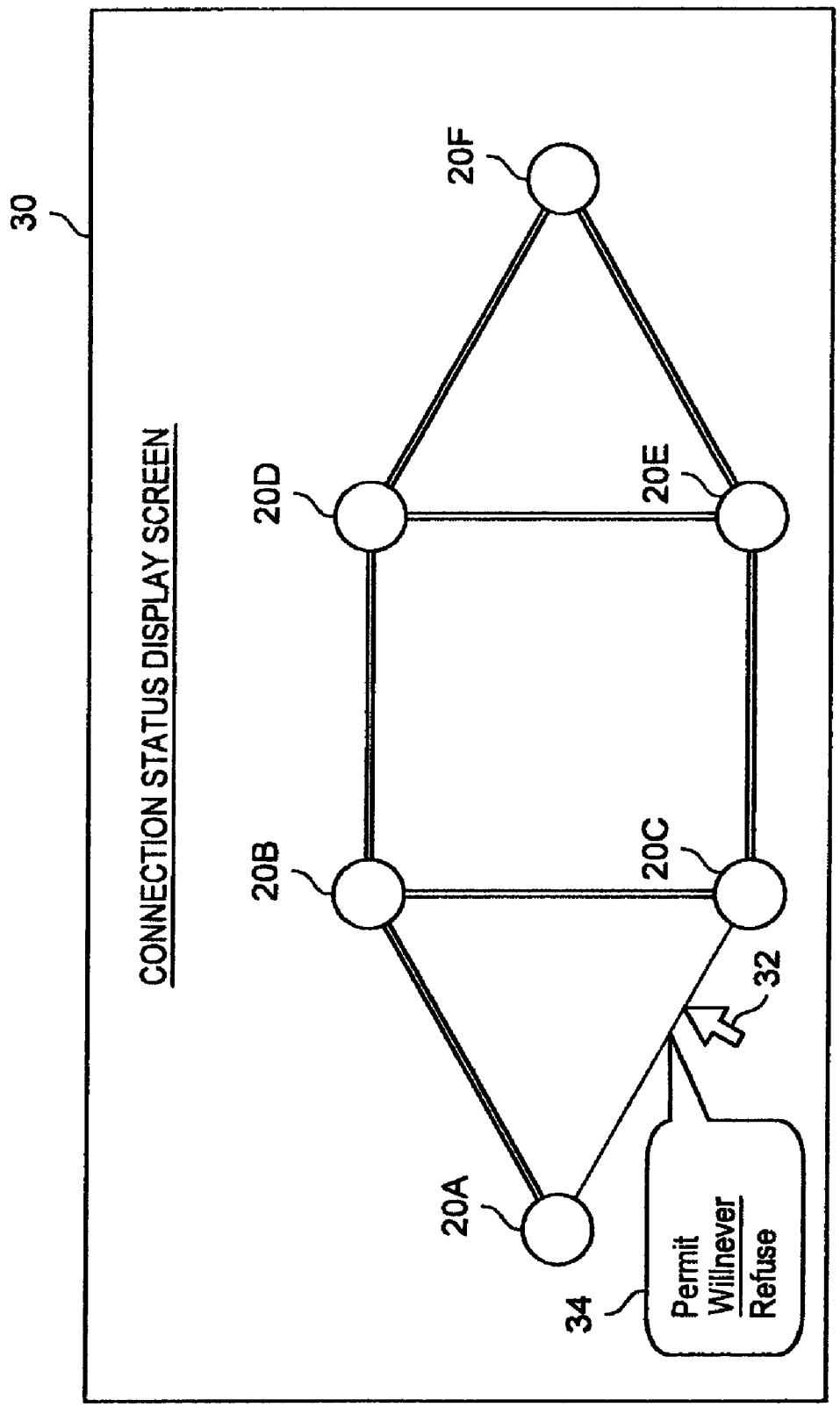
FIG. 12 is an explanatory diagram showing a case where a user operation is being performed on the display screen showing connection status.

FIG. 12 is an explanatory diagram showing a case where a user operation is being performed on the display screen 30 showing connection status. To be more precise, FIG. 12 shows a display screen 30 showing connection status generated by the display screen generator 228 after the user pointed to the wireless link between the wireless communication devices 20A and 20C with the cursor 32 and selected Willnever in the status selection window 34.

As shown in FIG. 12, when the wireless link between the wireless communication devices 20A and 20C is changed to Willnever by the user, the display screen generator 228 changes the display of the wireless link between the wireless communication devices 20A and 20C to a single line indicating Willnever. Incidentally, in the above, examples have been described where the status of the wireless link is shown in a double line, a single line or a dotted line, but the present embodiment is not limited to such examples. For example, the status of the wireless link may be shown, distinguished based on the form, the thickness, the colour or the transparency of the line, or a symbol, or the like.

FIG. 13 is an explanatory diagram showing the updated path table. To be more precise, FIG. 13 shows the path table updated by the path table generator 220 after the wireless link between the wireless communication devices 20A and 20C is changed to Willnever by the user. When the wireless link between the wireless communication devices 20A and 20C is changed to Willnever, the wireless link between the wireless communication devices 20A and 20C can no longer be used as a relay link. Accordingly, when the wireless link between the wireless communication devices 20A and 20C is changed to Willnever, as shown in FIG. 13, except for the communication path to the wireless communication device 20C, all communication paths are changed to communication paths, which go through the wireless communication device 20B.

Based on the path table generated by the path table generator 220 in such a manner and stored in the storage 224, the transmission data generator 240 generates a header of data to be transmitted to a desired destination wireless communication device 20 including the next hop device address and the like.

(3) Operation of the Wireless Communication Device

Heretofore, the configuration of the wireless communication device 20 has been described. Next, a method for generating a display executed in the wireless communication device 20 will be described.

Figure 14:
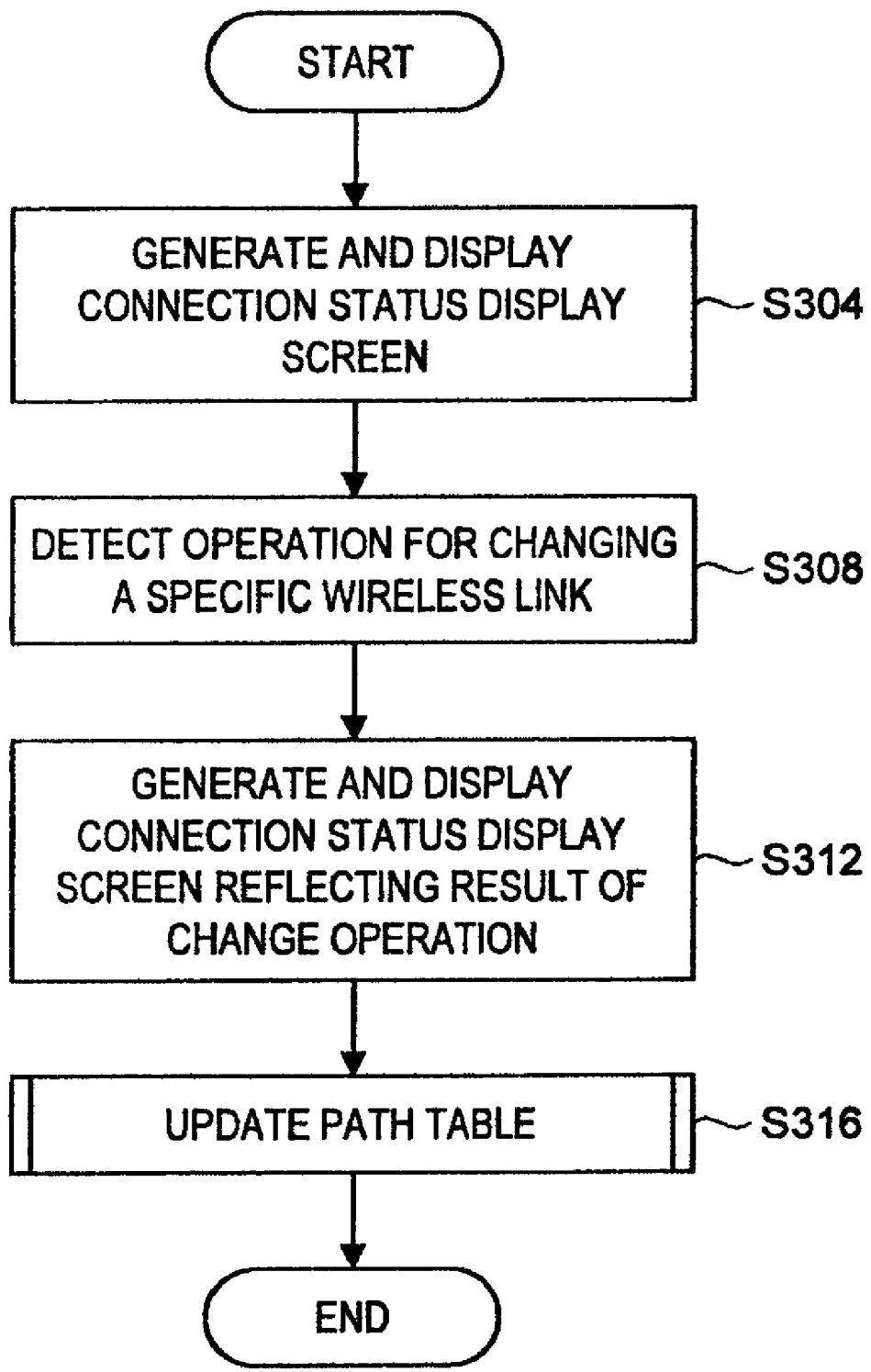
FIG. 14 is a flow chart showing a flow of a method for generating a display executed in the wireless communication device.
Figure 15:
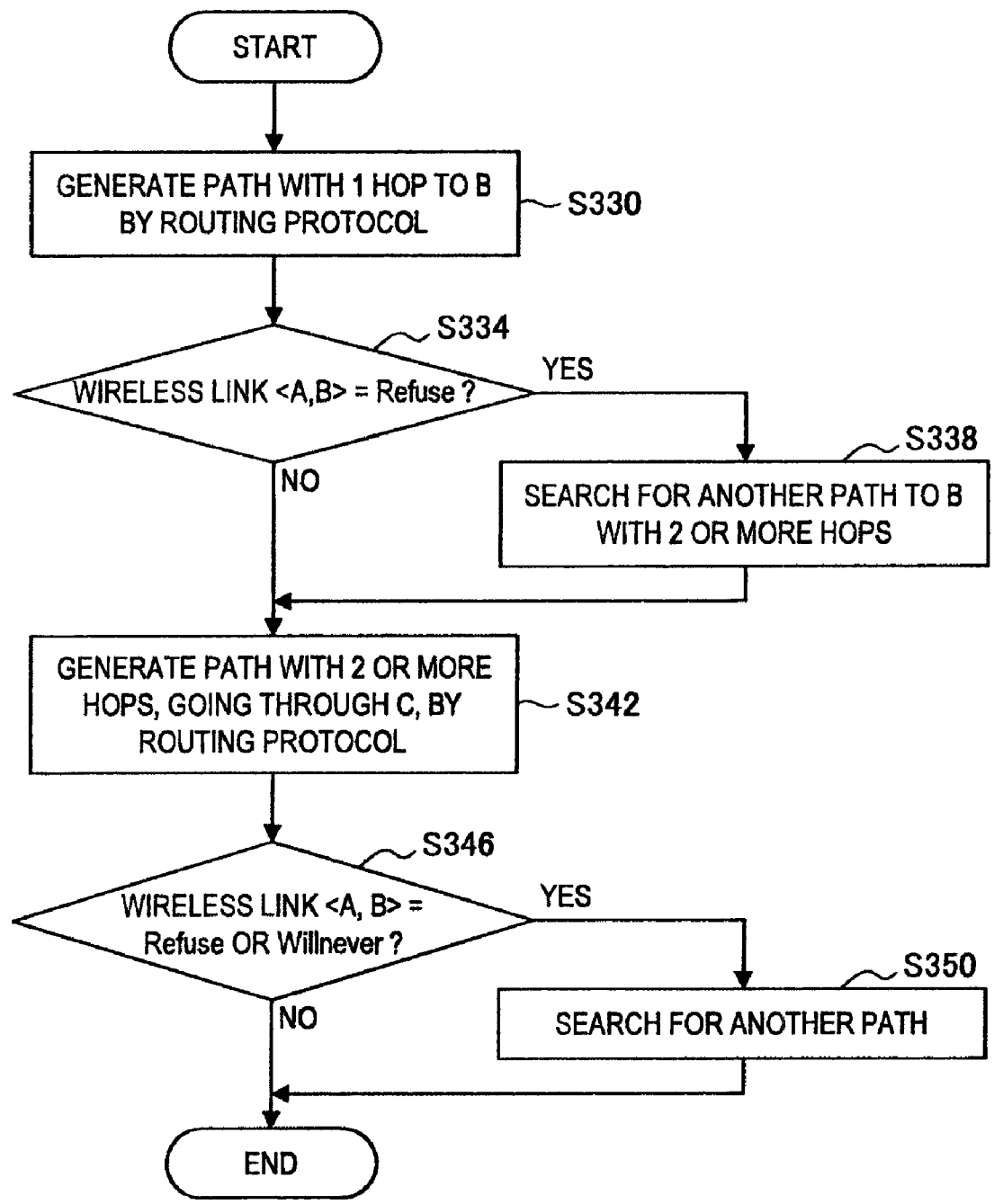
FIG. 15 is a flow chart showing a flow of a method for generating a display executed in the wireless communication device.

FIGS. 14 and 15 are now charts showing the flow of the method for generating a display executed in the wireless communication device 20. As shown in FIG. 14, first, the display screen generator 228 of the wireless communication device 20 generates a display screen showing connection status, and the display 232 displays the display screen showing connection status (S304).

Next, when the user operation detector 236 detects an operation of changing a specific wireless link (S308), the display screen generator 228 generates a display screen showing connection status reflecting the content of the change operation, and the display 232 displays the display screen showing connection status (S312). Next, the path table generator 220 updates the path table based on the content of the change operation (S316).

The updating of the path table of the wireless communication device 20A will be concretely described with reference to FIG. 15. First, the path table generator 220 of the wireless communication device 20A generates a path to the wireless communication device 20B with 1 hop based on the routing protocol (S330). Next, when the wireless link between the wireless communication devices 20A and 20B is Refuse (S334), the path table generator 220 searches for another path to the wireless communication device 20B with 2 or more hops (S338). Incidentally, "wireless link <A,B>" shown in FIG. 15 indicates the status of the wireless link between the wireless communication device 20A and the wireless communication device 20B.

Then, the path table generator 220 generates a path with 2 or more hops, going through the wireless communication device 20C (S342). When the wireless link between the wireless communication devices 20A and 20C is Refuse or Willnever (S346), the path table generator 220 searches for another path, which does not go through the wireless communication device 20C (S350).

(4) Conclusion

As described above, according to the present embodiment, in the wireless multi-hop network, in a system where a path is generated in an autonomous and distributed manner by the routing protocol, the status of a wireless link between the wireless communication devices 20 can be set by a user (third party), and, based on the setting, the routing protocol can reset the path in an autonomous and distributed manner.

Thus, notifying event information that the user is aware of beforehand, such as cutting off of power of the wireless communication device 20, allows the routing protocol to reset a path in an autonomous and distributed manner such that cost for switching a path caused by the event is avoided beforehand.

Also, since basically the path setting is performed automatically without depending on the routing protocol being used, the present embodiment can be applied to an existing system comparatively easily without drastically changing the characteristics of the routing protocol.

Also, using graphic display in the method for changing the status (path policy) of a wireless link allows a user to instinctively manage the path table, and it is anticipated to be applied on a system intensively managing a wireless multi-hop network.

It should be understood by those skilled in the art that various modifications, combinations, sub-combinations and alterations may occur depending on design requirements and other factors insofar as they are within the scope of the appended claims or the equivalents thereof.

For example, in the embodiment described above, an example has been described where the wireless communication device 20 displays the display screen showing connection status and detects the change operation by the user, but the present invention is not limited to such an example. For example, an information processor connected to the wireless communication device 20 by an arbitrary method may display the display screen showing connection status, detect the change operation by the user, and generate a new display screen. Further, the information processor may, on detecting the change operation by the user, transmit the content of the change operation to the connected wireless communication device 20. With such a configuration, the wireless communication device 20 may reset the communication path based on the content of the change operation received from the information processor.

Further, in the embodiment described above, an example has been described where the user performs the operation of changing a wireless link when the user is aware beforehand of the change in the status of a wireless link, but the present invention is not limited to such an example. For example, when the user wants to avoid using a certain wireless communication device as a relay device, due to the fact that the battery of the wireless communication device is low, the wireless communication device is battery-driven, the performance of the wireless communication device is extremely poor, or the like, the user may change the wireless link relating to the wireless communication device to Willnever.

Further, the respective steps of the processing in the wireless communication device 20 according to this specification do not necessarily have to be performed in a temporal sequence in the order shown in the flow charts. For example, the respective steps of the processing in the wireless communication device 20 may also be performed in parallel or individually (for example, in parallel processing or processing according to an object).

It is also possible to create a computer program that will cause the hardware that is built into the wireless communication device 20, such as the CPU 201, the ROM 202, the RAM 203, and the like, to exhibit functions that are equivalent to each structure in the wireless communication device 20 described above. A storage medium may also be provided to store the computer program. Further, a series of processes can be implemented in hardware by configuring as hardware the function blocks shown in the function block diagram in FIG. 6.

What is claimed is:

1. A display generating device comprising:
a display screen generator generating a display screen showing whether a link between each of a plurality of wireless communication devices is usable as a relay link or a non-relay link, as a connection status between each of the plurality of wireless communication devices in a wireless network in which the plurality of wireless communication devices operates in an autonomous and distributed manner;
a detector detecting a change in connection status to a first connection status, which is performed by a user via the display screen generated by the display screen generator, the first connections status:
  (i) permitting data transmission through a first path when a first of the plurality of the wireless communication devices is a destination for the data; and
  (ii) prohibiting data transmission through the first path when another one of the plurality of wireless communication devices is the destination for the data; and
a transmitter configured to transmit content of the operation of changing connection status to whichever one of the first one of the plurality of wireless communication devices or the another one of the plurality of wireless communication devices is selected as the destination for the data; wherein
when the operation of changing connection status is detected by the detector, the display generating device performs a change process of reflecting the content of the operation of changing connection status.

2. The display generating device according to claim 1, wherein
the display generating device has a function of one of the wireless communication devices configuring the wireless network, further comprising:
a path setter configured to set a path to another wireless communication device in the wireless network, wherein when the operation of changing connection status is detected by the detector, the path setter resets, as the change process, the path to the another wireless communication device according to the content of the operation of changing connection status.

3. The display generating device according to claim 1, wherein
when the operation of changing connection status is detected by the detector, the display screen generator generates, as the change process, a display screen reflecting the content of the operation of changing connection status.

4. The display generating device according to claim 3, wherein
the transmitter is configured to transmit the content of the operation of changing connection status, when the operation of changing connection status to the first connection status is detected by the detector.

5. The display generating device according to claim 1, wherein the display screen generator is configured to generate the display screen showing whether the link between each of the plurality of wireless communication devices is usable as a non-relay link.

6. The display generating device according to claim 5, wherein the display screen generator is configured to generate the display screen showing the link between each of the plurality of wireless communication devices prohibiting use as either a relay link or a non-relay link.

7. A display generating method, comprising the steps of:
generating a display screen showing whether a link between each of a plurality of wireless communication devices is usable as a relay link or a non-relay link, as a connection status between each wireless communication device in a wireless network in which the plurality of wireless communication devices operates in an autonomous and distributed manner;
detecting a change in connection status to a first connection status, which is performed by a user via the display screen, wherein the first connections status:
  (i) permits data transmission through a first path when a first of a plurality of the wireless communication devices is a destination for the data; and
  (ii) prohibits data transmission through the first path when another one of the plurality of wireless communication devices is the destination for the data;
transmitting content of the operation of changing connection status to whichever one of the first one of the plurality of wireless communication devices or the another one of the plurality of wireless communication devices is selected as the destination for the data:
and
performing, when the operation of changing connection status is detected, a change process of reflecting the content of the operation of changing connection status.

8. The display generating method according to claim 7, wherein generating the display screen shows whether the link between each of the plurality of wireless communication devices is usable as a non-relay link.

9. The display generating method according to claim 8, wherein generating the display screen further shows whether the link between each of the plurality of wireless communication devices is prohibited from being used as either a relay link or a non-relay link.

10. A non-transitory computer-readable storage medium storing thereon a computer program which, when executed, causes a processor to function as:

a display screen generator generating a display screen showing whether a link between each of a plurality of wireless communication devices is usable as a relay link or a non-relay link, as a connection status between each wireless communication device in a wireless network in which the plurality of wireless communication devices operates in an autonomous and distributed manner;
a detector detecting a change in connection status to a first connection status, which is performed by a user via the display screen generated by the display screen generator, the first connections status:
  (i) permitting data transmission through a first path when a first of a plurality of the wireless communication devices is a destination for the data; and
  (ii) prohibiting data transmission through the first path when another one of the plurality of wireless communication devices is the destination for the data; and
a transmitter configured to transmit content of the operation of changing connection status to whichever one of the first one of the plurality of wireless communication devices or the another one of the plurality of wireless communication devices is selected as the destination for the data;
wherein
the program causes the processor to perform, when the operation of changing connection status is detected by the detector, a change process of reflecting the content of the operation of changing connection status.

11. The computer program according to claim 10, wherein the computer program causes the processor to function as the display screen generator such that the display screen generator is configured to generate the display screen showing whether the link between each of the plurality of wireless communication devices is usable as a non-relay link.

12. The computer program according to claim 11, wherein the computer program causes the processor to function as the display screen generator such that the display screen generator is configured to generate the display screen showing the link between each of the plurality of wireless communication devices prohibiting use as either a relay link or a non-relay link.

13. A wireless communication system comprising a plurality of wireless communication devices that operates in an autonomous and distributed manner and configure a wireless network, wherein
each of the plurality of the wireless communication devices includes:
  a path setter configured to set a path to another wireless communication device in the wireless network;
  a display screen generator generating a display screen showing whether a link between each of the plurality of wireless communication devices is usable as a relay link or a non-relay link, as a connection status between each wireless communication device in the wireless network;
  a detector detecting a change in connection status to a first connection status, which is performed by a user via the display screen generated by the display screen generator, the first connections status:
    (i) permitting data transmission through a first path when a first of a plurality of the wireless communication devices is a destination for the data; and
    (ii) prohibiting data transmission through the first path when another one of the plurality of wireless communication devices is the destination for the data; and a transmitter configured to transmit content of the operation of changing connection status to whichever one of the first one of the plurality of wireless communication devices or the another one of the plurality of wireless communication devices is selected as the destination for the data.

14. The wireless communication system according to claim 13, wherein the display screen generator of each of the plurality of wireless communication devices is configured to generate the display screen showing whether the link between each of the plurality of wireless communication devices is usable as a non-relay link.

15. The wireless communication system according to claim 14, wherein the display screen generator of each of the plurality of wireless communication devices is further configured to generate the display screen showing the link between each of the plurality of wireless communication devices prohibiting use as either a relay link or a non-relay link.

* * * * *